US012420377B2

(12) United States Patent
Barth

(10) Patent No.: US 12,420,377 B2
(45) Date of Patent: Sep. 23, 2025

(54) QUICK CLAMPING DEVICE

(71) Applicant: Robert Bosch GmbH, Stuttgart (DE)

(72) Inventor: Daniel Barth, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 18/171,984

(22) Filed: Feb. 21, 2023

(65) Prior Publication Data

US 2023/0191556 A1 Jun. 22, 2023

Related U.S. Application Data

(63) Continuation of application No. 16/627,651, filed as application No. PCT/EP2018/070744 on Jul. 31, 2018, now Pat. No. 11,607,773.

(30) Foreign Application Priority Data

Aug. 11, 2017 (DE) ..................... 10 2017 214 117.4

(51) Int. Cl.
*B24B 45/00* (2006.01)
*B24B 23/02* (2006.01)
(Continued)

(52) U.S. Cl.
CPC .......... *B24B 45/006* (2013.01); *B24B 23/022* (2013.01); *B24B 23/028* (2013.01);
(Continued)

(58) Field of Classification Search
CPC ..... B24B 23/04; B24B 23/022; B24B 23/028; B24B 45/006
See application file for complete search history.

(56) References Cited

U.S. PATENT DOCUMENTS 6,869,346 B2 3/2005 Wendt et al.
9,545,699 B2 1/2017 Furusawa et al.
(Continued)

FOREIGN PATENT DOCUMENTS

CN 1157587 A 8/1997
CN 1366481 A 8/2002
(Continued)

OTHER PUBLICATIONS

International Search Report corresponding to PCT Application No. PCT/EP2018/070744, mailed Nov. 28, 2018 (German and English language document) (5 pages).

*Primary Examiner* — Daniel Jeremy Leeds
(74) *Attorney, Agent, or Firm* — Maginot, Moore & Beck LLP

(57) ABSTRACT

A quick clamping device for arranging at least one application tool on a power tool, in particular on an angle grinder, includes at least one output unit for moving the application tool about an output axis of the output unit, and at least one fixing unit having at least one movably mounted fixing element that is mounted, in particular in a non-removable manner, on the output unit, at least for axially fixing the application tool to the output unit. The quick clamping device has at least one securing unit, which has at least one, in particular movably mounted, securing element that is intended to secure the fixing element, which is mounted so as to be movable relative to the output unit at least about the output axis, so as to prevent the fixing element from moving about the output axis.

19 Claims, 4 Drawing Sheets

(51) Int. Cl.
*B24B 23/04* (2006.01)
*B25F 5/00* (2006.01)
*B27B 5/32* (2006.01)

(52) U.S. Cl.
CPC ............... *B24B 23/04* (2013.01); *B25F 5/001* (2013.01); *B27B 5/32* (2013.01)

(56) References Cited

U.S. PATENT DOCUMENTS

| | | | |
|---|---|---|---|
| 2002/0028644 A1* | 3/2002 | Rudolf .................... | B24B 23/02 451/344 |
| 2010/0197208 A1 | 8/2010 | Blickle et al. | |
| 2013/0082449 A1 | 4/2013 | Bernardi et al. | |
| 2013/0180747 A1 | 7/2013 | Brown et al. | |
| 2014/0084552 A1 | 3/2014 | Zieger et al. | |
| 2015/0042052 A1 | 2/2015 | Furusawa et al. | |
| 2017/0259348 A1* | 9/2017 | Scott ..................... | B27B 19/006 |

FOREIGN PATENT DOCUMENTS

| | | | |
|---|---|---|---|
| CN | 1179822 | C | 12/2004 |
| CN | 101043963 | A | 9/2007 |
| CN | 103596726 | A | 2/2014 |
| CN | 104416547 | A | 3/2015 |
| DE | 199 44 564 | A1 | 3/2001 |
| DE | 100 17 457 | A1 | 10/2001 |
| DE | 103 61 810 | A1 | 7/2005 |
| DE | 10 2006 001 986 | A1 | 7/2007 |
| DE | 10 2010 043 190 | A1 | 5/2012 |
| DE | 10 2011 085 561 | A1 | 12/2012 |
| EP | 2 213 419 | A1 | 1/2010 |
| JP | S58-98163 | U | 7/1983 |
| JP | S60-180763 | U | 9/1985 |
| JP | H1-193164 | A | 8/1989 |
| JP | 2000-190198 | A | 7/2000 |
| JP | 2003-530228 | A | 10/2003 |
| JP | 2006-180763 | A | 7/2006 |
| JP | 2006-322945 | A | 11/2006 |
| JP | 2013-158879 | A | 8/2013 |
| KR | 89-9540 | A | 8/1989 |
| KR | 2002-0020725 | A | 3/2002 |
| RU | 2 588 909 | C2 | 12/2014 |
| RU | 2 596 931 | C2 | 7/2015 |
| WO | 2008/149369 | A1 | 12/2008 |

* cited by examiner

QUICK CLAMPING DEVICE

This application is a continuation application of copending U.S. patent application Ser. No. 16/627,651 filed on Dec. 30, 2019, which is a 35 U.S.C. § 371 National Stage Application of PCT/EP2018/070744, filed on Jul. 31, 2018, which claims the benefit of priority to Serial No. DE 10 2017 214 117.4, filed on Aug. 11, 2017 in Germany, the disclosures of all of which are incorporated herein by reference in their entirety

BACKGROUND

Already known from DE 103 61 810 A1 is a quick-change clamping device for arranging at least one insert tool on a power tool, wherein the quick-change clamping device comprises at least one output unit for moving the insert tool about an output axis of the output unit, and at least one fixing unit, having at least one movably mounted fixing element, at least for axially fixing the insert tool on the output unit.

SUMMARY

The disclosure is based on a quick-change clamping device for arranging, in particular so as to allow fixing without the use of tools, at least one insert tool on a power tool, in particular on a power angle grinder, comprising at least one output unit for moving the insert tool about an output axis of the output unit, and comprising at least one fixing unit, having at least one fixing element mounted in a movable, in particular non-removable, manner on the output unit, at least for axially fixing the insert tool on the output unit.

It is proposed that the quick-change clamping device have at least one securing unit, which has at least one, in particular movably mounted, securing element, which is designed to secure the fixing element, which is mounted so as to be movable relative to the output unit, at least about the output axis, against a movement of the fixing element about the output axis, in particular in at least one operating state, preferably in an open state.

Advantageously, highly convenient operation can be achieved. Preferably, it can be made easy to mount and/or demount an insert tool on/from the power tool, thereby making it possible, advantageously, to achieve a time saving, in particular in changing the insert tool and/or in putting the power tool into operation. In particular, by means of the described design, an open state of the quick-change clamping device can advantageously be secured against automatic and/or unintentional closure, thereby making it possible, in particular, to increase efficiency and/or user-friendliness, in that, for example, an insert tool can be clamped-in directly, in particular without re-opening the quick-change clamping device. Advantageously, the quick-change clamping device has a small number of parts, with the result, in particular, that production costs can be kept low.

Preferably, the output unit is designed to transmit a rotational and/or oscillatory movement about the output axis to an insert tool fixed to the output unit by means of the fixing unit. Preferably, the output unit is operatively connected, in a manner already known to persons skilled in the art, to a drive unit of the power tool, in particular via at least one drive pinion of the drive unit. The output unit comprises, in particular, at least one sleeve and/or at least one hollow shaft, in particular a hollow spindle. The rotational and/or oscillatory movement of the output unit can preferably be generated as a result of the output unit acting in combination with the drive unit of the power tool, which comprises at least one electric motor. That a component, in particular the fixing element, is "mounted in a non-removable manner" is to be understood to mean, in particular, that the component, in particular the fixing element, is arranged in a captive manner on at least one further component, in particular the output unit, and/or is preferably inseparable from the output unit when the quick-change clamping device is in the functional and/or functionally ready state, in particular in an open state, and when the quick-change clamping device is in a closed state. Preferably, the fixing element is arranged in a captive manner on the output unit. In particular, the fixing element arranged in a captive manner on the output unit, and/or each further component arranged in a captive manner on the output unit, is/are captively connected to the output unit, in particular when the quick-change clamping device is in the open state and/or in the closed state. An "open state" of the quick-change clamping device is to be understood to mean, in particular, a state of the quick-change clamping device that is designed to enable an insert tool, arranged on the quick-change clamping device, to be demounted, and/or to enable the quick-change clamping device to be mounted of an insert tool on the quick-change clamping device. A "closed state" of the quick-change clamping device is to be understood to mean, in particular, a state of the quick-change clamping device in which an insert tool is fixed in a functionally ready manner on the output unit, and/or in which, in particular non-destructive, demounting of an insert tool from the output unit is impossible. The fixing element is designed, in particular when the quick-change clamping device is in the closed state, to produce a force closure and/or form closure for holding an insert tool, in particular a grinding disk, on the quick-change clamping device. Preferably, the fixing element produces a, in particular axial, positive closure, preferably by pressing at least a part of the insert tool against at least a part of the output unit. It is conceivable for the fixing element to produce, in particular in addition to the axial form closure, a form closure in the radial direction and/or in the circumferential direction, the circumferential direction lying in a plane whose surface normal extends parallel to the output axis. "To allow fixing without the use of tools" is to be understood to mean, in particular, that it is possible for an operation of arranging an insert tool on the quick-change clamping device and/or changing over between the open state and the closed state to be performed independently of the use of an external tool such as, for example, a wrench, a hexagon key, or the like. The fixing element is mounted, in particular, so as to be translationally and/or rotationally movable, about the output axis, in the axial direction, in particular in relation to the output unit, a movement axis, in particular rotation axis, of the fixing element preferably coinciding, at least substantially, with the output axis. The output unit encompasses the fixing element, at least partially, in particular along a circumferential direction, which lies in a plane whose surface normal is at least substantially parallel to the output axis. Preferably, the output unit comprises a hollow shaft, for at least partially receiving the fixing element. The securing unit has, in particular, at least one securing element, preferably at least two, advantageously at least three, more preferably at least four, or particularly preferably a plurality of securing elements. In particular, the securing element, in particular in the open state, is designed to form at least one form closure with the fixing element, in particular for the purpose of fixing the fixing element in the open state. Preferably, following opening of the quick-change clamping device, the securing element moves automatically into a securing position for the purpose of securing the fixing element, in particular against rotating and/or reverting to the closed state. The automatic movement of the securing element may be effected, in particular, by means of a restoring force, for example of a spring, and/or by means of a motor-generated force, for example by an actuator of the securing unit. It is conceivable for the securing element to be realized as a movably mounted pin, which in particular may be round, angular and/or flat, as a foldable hinge, as a hook, as a permanent magnet or as an electromagnet. “Designed” is to be understood to mean, in particular, specially programmed, configured and/or equipped. That an object is designed for a particular function, is to be understood to mean, in particular, that the object fulfils and/or executes this particular function in at least one application state and/or operating state. In particular, such a quick-change clamping device may advantageously be of a compact design, thereby making it possible, in particular, to mount small insert tools, for example insert tools having a diameter of 100 mm or less.

It is also proposed that the securing element have at least one contact surface, in particular a contact surface of an axial extension of the securing element, which is designed to bear against the fixing element. Advantageously, it can be achieved that the fixing element is well secured, in particular against rotating out of the open state. Advantageously, a high degree of safety, in particular a high degree of operating safety, can be achieved, thereby making it possible, in particular, to prevent injuries during operation. Moreover, advantageously, the contact surface makes it possible to achieve a secure form closure for holding the fixing unit. In particular, the contact surface may be at least partially flat and/or curved. When the fixing element is secured by the securing element, in particular a force exerted by the fixing element acts at least substantially perpendicularly upon the contact surface. It is additionally conceivable for the fixing element to have a corresponding contact surface which, in particular, has an outer shape that correlates at least substantially oppositely to the contact surface and/or engages at least partially in the contact surface. Preferably, the contact surface forms a form closure with the fixing element, in particular with a contact surface of the fixing element. Preferably, the securing element has a further contact surface that is designed to bear against an insert tool when the quick-change clamping device is in the closed state and/or in a process of closing. Preferably, when the securing element is in a fully extended state, and/or when the quick-change clamping device is in the open state, the further contact surface is arranged in an offset manner in relation to a surface of the fixing element that faces away from the power tool. In particular, the further contact surface, as viewed in a direction away from the power tool and parallel to the output axis, is arranged in front of the surface of the fixing element that faces away from the power tool. A distance between the surface of the fixing element, that faces away from the power tool, and the further contact surface is at least 1 mm, preferably at least 3 mm. This advantageously makes it possible to create a fit that, in particular, enables an insert tool to be aligned in a simple and precisely fitting manner during mounting.

Furthermore, it is proposed that the securing element be movably mounted on at least one output element of the output unit, in particular in a recess delimited by the output element. Advantageously, highly convenient operation can be achieved. In particular, as a result of the securing element being mounted on a further component of the quick-change clamping device, loss of the securing element can advantageously be prevented. In particular, a movable mounting advantageously enables simple activation and/or deactivation of the securing element, Advantageously, such a mounting of the securing element makes it possible to achieve a compact design. In particular, the securing element is mounted in a non-removable manner on the output element and/or arranged in a captive manner on the output element. The securing element can be moved, in particular, in one, preferably two, or more preferably in three spatial directions, in particular at least the spatial direction, or at least one of the spatial directions, being at least substantially parallel to the output axis. In particular, the securing element, as viewed along the output axis, is arranged in a lower part of the output unit that faces toward a tool receiver of the quick-change clamping device. A recess delimited by the output element may be realized, in particular, as a sleeve, as a hole, or as a round and/or angular tube that, preferably, is integrally connected to the output element. A force applied to the securing element can thereby advantageously be diverted to the stable output element, enabling a high degree of stability to be achieved. In particular, the securing element can be moved, at least partially, into and out of the recess. “Integral” is to be understood to mean, in particular, connected at least in a materially bonded manner, for example by a welding process, an adhesive process, an injection process and/or another process considered appropriate by persons skilled in the art, and/or, advantageously, formed in one piece such as, for example, by being produced from a casting and/or by being produced in a single or multi-component injection process and, advantageously, from a single blank.

Moreover, it is proposed that the securing unit have at least one securing spring, which biases the securing element with a spring force in the direction of a securing position of the securing element. Advantageously, ease of operation can be achieved, in particular in that the securing element can automatically assume a securing position, in particular after the open state of the quick-change clamping device has been set. It is also advantageously possible to prevent unintentional unlocking of the securing element, in particular by a restoring force of the securing spring. In particular, the spring force of the securing spring is directed, at least partially, in a direction that is at least substantially parallel to the output axis. The securing spring is designed, in particular, to displace the securing element automatically into a blocking position that is designed to block the fixing element against rotation. The securing spring may be realized, in particular, as a spiral spring, as a torsion spring, preferably a compression spring and/or a tension spring, as an air spring and/or as a disk spring.

Furthermore, it is proposed that the fixing unit have at least one clamping spring which, in at least one operating state, generates a clamping force that, by means of transmission via the fixing element, produces a pressing force upon the securing element. In particular, an advantageous transmission of force can be achieved. Advantageously, an expenditure of force required for opening and closing the quick-change clamping device can be optimized, in particular in that a force applied in opening can advantageously be stored, by means of the clamping spring, until a closing operation. Moreover, advantageously, an automatically acting closing operation is made possible. Advantageously, a high degree of user-friendliness and/or ease of operation can be achieved. The clamping spring may be realized, in particular, as a spiral spring, as a torsion spring, preferably a compression spring and/or a tension spring, as an air spring and/or as a disk spring. In particular, the fixing element transforms the clamping force of the clamping spring directly, preferably without interposed elements, into a pressure force of the fixing element upon the securing element. In particular, the clamping spring is arranged, at least partially, within the fixing unit, in particular the fixing element. That the clamping spring is arranged "at least partially within" the fixing element is to be understood to mean, in particular, that the fixing element encompasses the clamping spring by at least 50%, preferably by at least 70%, or more preferably by at least 90%, in a circumferential direction that extends in a plane whose surface normal is parallel to the output axis. Preferably, the clamping spring transmits a further clamping force indirectly, in particular via a cam mechanism of the quick-change clamping device, to the fixing element. In particular, in this case a longitudinal force of the clamping spring generates a torque, in particular via the cam mechanism. The cam mechanism advantageously converts the torque, in particular via a thread, into a clamping force in the axial direction. As a result, advantageously, upon rotation relative to the output unit, about the output axis, the fixing element moves, in particular simultaneously, in the axial direction relative to the output element.

It is also proposed that a maximum possible axial displacement of the fixing element out of a position that can be fixed by the securing element is at most 10 mm, advantageously at most 6 mm, preferably at most 2 mm, more preferably at most 1 mm, or particularly preferably at most 0.4 mm. Advantageously, flexibility can be increased, in particular in that a multiplicity of different insert tools, having different thickness, can be clamped into the quick-change clamping device. Advantageously, a compact design of the quick-change clamping device can be achieved. In addition, advantageously, the fixing element can be secured against loss, in particular in that a maximum possible displacement of the fixing element is defined in the quick-change clamping device. Moreover, in particular a minimum axial position difference of the fixing element, in particular of a part of the fixing element terminating the fixing element in the axial direction, between the open state and the closed state, is at least 0.15 mm, preferably at least 0.5 mm, or preferably at least 1.0 mm.

It is additionally proposed that the quick-change clamping device have a cam mechanism that is designed to move the fixing element back and forth at least between two end positions, wherein one of the end positions is a position that can be fixed by the securing unit. In particular, an advantageous transmission of force and/or conversion of force can be achieved. Advantageously, user-friendliness can be increased, in particular in that a simple operator handle, for example a push of a button and/or a lever adjustment, can be converted into a more complex movement, for example a rotational movement, of the fixing element. In particular, the cam mechanism is designed to convert a linear movement, in particular of an unlocking pin of the quick-change clamping device, at least partially, into a rotational movement, in particular of the fixing element. An "end position" is to be understood to mean, in particular, a position in the open state and/or a position in the closed state. A "position that can be fixed by the securing unit" is to be understood to mean, in particular, a position in the open state. Preferably, a "cam mechanism" is designed to convert a linear movement into a movement that is at least partially different from a linear movement, for example a rotational movement, or to convert into a linear movement a movement that is at least partially different from a linear movement.

Furthermore, it is proposed that the quick-change clamping device have at least one cam mechanism, wherein the output element has a recess that forms a cam mechanism element of the cam mechanism, and in particular realizes a path having a course angled in relation to the output axis. In particular, an advantageous transmission of force and/or conversion of force can be achieved. Advantageously, by means of such a cam mechanism, a movement of a component relative to the output unit can be constrained. A "cam mechanism element" is to be understood to mean, in particular, an element of the cam mechanism that is directly instrumental, at least, in conversion of force and/or transmission of force by the cam mechanism. In particular, the path of the cam mechanism element may have a straight course, a singly angled course, a multiply angled course, a helical course, or other curved course.

Moreover, it is proposed that the quick-change clamping device have at least one cam mechanism that has at least one, in particular further, cam mechanism element, which, at least partially, is arranged in a movable manner, in particular a linearly and/or rotationally movable manner, within the fixing element. In particular, an advantageous transmission of force and/or conversion of force can be achieved. Moreover, advantageously, a compact design becomes achievable. In particular the, in particular further, cam mechanism element is designed to engage, at least partially, in a cam mechanism element that is other than the, in particular further, cam mechanism element. In particular, an interaction of the, in particular further, cam mechanism element with the cam mechanism element that is other than the, in particular further, cam mechanism element causes two components, in particular having cam mechanism elements, to rotate against one another. That the, in particular further, cam mechanism element is arranged "at least partially within" the fixing element is to be understood to mean, in particular, that the fixing element encompasses the, in particular further, cam mechanism element by at least 50%, preferably by at least 70%, or more preferably by at least 90%, in a circumferential direction that extends in a plane whose surface normal is parallel to the output axis.

Furthermore, it is proposed that the output unit have at least one torque transmission element, which, in at least one position of the fixing element that realizes, in particular, an open state of the quick-change clamping device, is at least substantially congruent with the fixing element, in particular with a locking part of the fixing element. Advantageously, in particular a large form-closure overlap makes it possible to achieve a good transmission of force, in particular of a torque, from the output unit to an insert tool. In addition, advantageously, it can be made easy to mount an insert tool in the quick-change clamping device, in particular in that the insert tool, when being mounted, can be easily moved over at least a part of the fixing element. Moreover, advantageously, a possibility for simple optical differentiation between a closed state and an open state of the quick-change clamping device can be achieved, in particular, in that, in the open state, there is a congruency that is absent in the closed state. In particular, the torque transmission element has, at least in part, a shape or outer contour of a star, a cross, a polygon, an ellipse and/or a further rotationally symmetrical geometrical figure. A "locking part" is to be understood to mean, in particular, the part of the fixing element that is designed, in at least one operating state, to produce a form closure for holding an insert tool, preferably by means of an at least partial overlap of a hub of an insert tool and of the torque transmission element. As a result, advantageously, large axial forces and/or torques can be transmitted, thereby making it possible, in particular, to safely receive and/or safely operate insert tools having large diameters, for example diameters of up to 230 mm, in particular diameters in a range of from 150 mm to 230 mm, or preferably diameters of greater than 230 mm. In particular, the locking part is integral with the fixing element. In particular, the locking part has, at least in part, a shape or outer contour of a star, a cross, a polygon, an ellipse and/or a further rotationally symmetrical geometrical figure.

It is also proposed that the fixing unit, in particular the fixing element, have at least one thread, realized as a trapezoidal thread or as a buttress thread. Advantageously, friction during movement can be kept to a low level. In addition, in particular, an advantageous guidance of movement, in particular of the rotational and translational movement of the fixing element between at least two end positions, can be rendered possible. Advantageously, in a closed state the thread generates frictional locking for holding an insert tool in the quick-change clamping device, in particular in addition to form-closure holding of an insert tool in the quick-change clamping device. Advantageously, the development of fretting corrosion, in particular between the output element, the fixing element and/or the insert tool, can be avoided. In particular, the thread has a thread pitch of at least 1 mm, preferably 2 mm, advantageously 3 mm, preferably 4 mm, or particularly preferably 6 mm. In particular, in moving between two end positions, the fixing element rotates by at least one twelfth of a full revolution, preferably by at least one tenth of a full revolution, advantageously by at least one eighth of a full revolution, preferably by at least one quarter of a full revolution, or particularly preferably by at least one half of a full revolution. The thread is realized, in particular, as an external thread. In particular, the output element has a thread, in particular realized as an internal thread, that corresponds to the thread. In particular, the thread of the output element is integral with the output element. In particular, the thread of the fixing element is integral with the fixing element.

Additionally proposed is an insert tool, in particular a grinding disk, having at least one connection means realized so as to correspond, at least substantially, to a contour of the fixing element and/or of the torque transmission element of the quick-change clamping device. Advantageously, highly convenient operation can be achieved. Preferably, it can be made easy to mount and/or demount an insert tool on/from the power tool, thereby making it possible, advantageously, to achieve a time saving, in particular in changing the insert tool and/or in putting the power tool into operation. Advantageously, good power transmission, in particular good take-up of a torque by the insert tool, can be rendered possible. The insert tool may be realized, in particular, as a grinding disk, as a saw blade, as a grinding plate, as flap wheel, as a backing pad, as a roughing disk, as a polishing disk and/or as a brush. The connection means is realized, in particular, as recess, preferably a through-recess and/or centered recess, of the insert tool. In particular, an inner contour of the insert tool corresponds to the outer contour of the torque transmission element and/or of the fixing element.

Additionally proposed is a power tool, in particular a power angle grinder, having at least one quick-change clamping device according to the disclosure. Advantageously, highly convenient operation can be achieved. Preferably, it can be made easy to mount and/or demount an insert tool on/from the power tool, thereby making it possible, advantageously, to achieve a time saving, in particular in changing the insert tool and/or in putting the power tool into operation.

Additionally proposed is a power tool system, having at least one power tool, in particular a power angle grinder that has at least one quick-change clamping device, and having at least one insert tool. Advantageously, highly convenient operation can be achieved. Preferably, it can be made easy to mount and/or demount an insert tool on/from the power tool, thereby making it possible, advantageously, to achieve a time saving, in particular in changing the insert tool and/or in putting the power tool into operation.

The quick-change clamping device according to the disclosure, the power tool according to the disclosure, the insert tool according to the disclosure and/or the power tool system according to the disclosure are/is not intended in this case to be limited to the application and embodiment described above. In particular, for the purpose of implementing a mode of functioning described herein, the quick-change clamping device according to the disclosure, the power tool according to the disclosure, the insert tool according to the disclosure and/or the power tool system according to the disclosure, may have a number of individual elements, components and units that differs from a number stated herein.

BRIEF DESCRIPTION OF THE DRAWINGS

Further advantages are given by the following description of the drawing. The drawing shows an exemplary embodiment of the invention. The drawing, the description and the claims contain numerous features in combination. Persons skilled in the art will also expediently consider the features individually and combine them to create appropriate further combinations.

There are shown.

DETAILED DESCRIPTION

Figure 1:
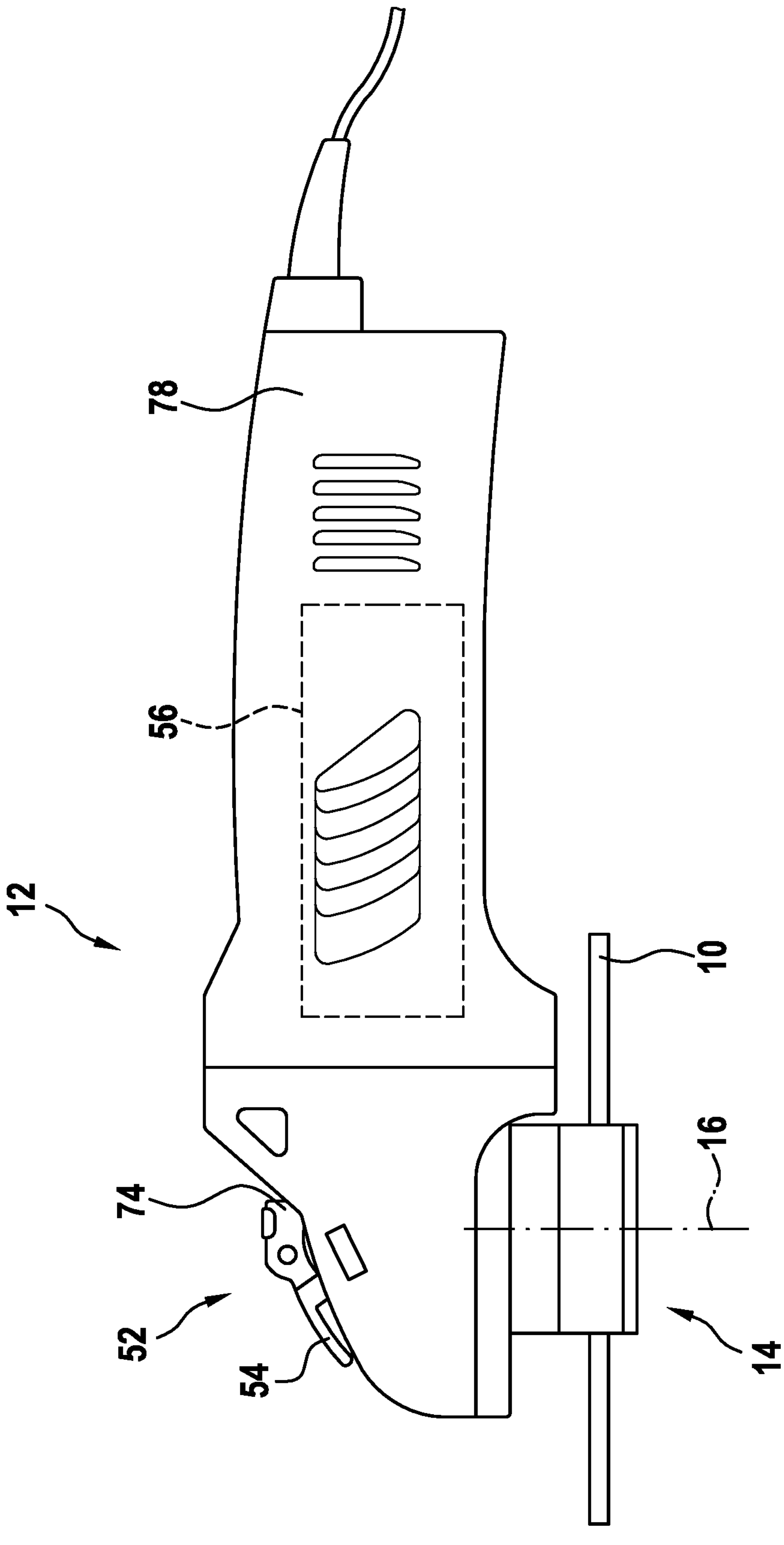
FIG. 1 a schematic view of a power tool system, comprising an insert tool, and comprising a power tool having a quick-change clamping device, FIG. 2 a schematic view of a section through the power tool and through the quick-change clamping device, FIG. 3 a schematic, perspective view of the quick-change clamping device, in an open state, and FIG. 4 a schematic bottom view of the quick-change clamping device, in a closed state, with the insert tool.
Figure 4:
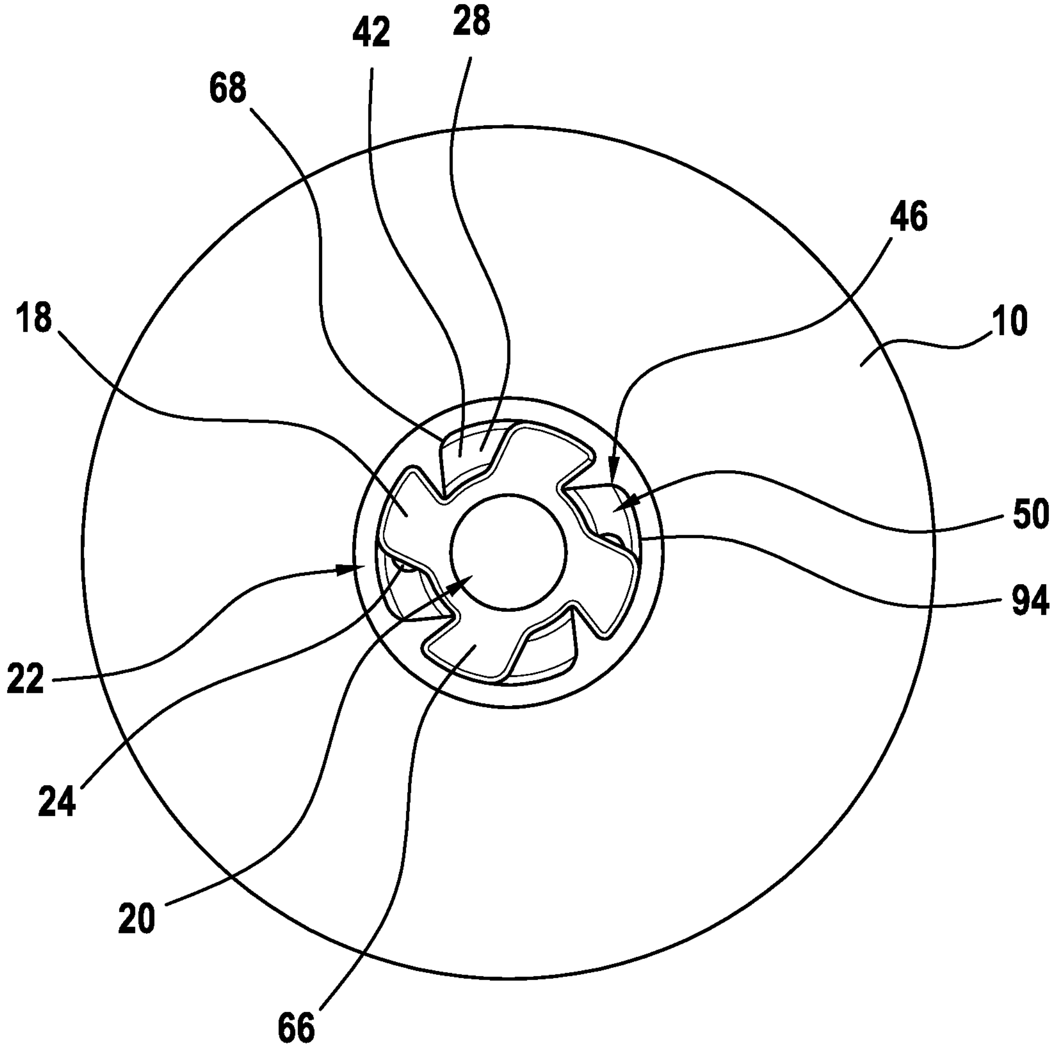

FIG. 1 shows a power tool system, comprising a power tool 12 that comprises a housing 78 and an insert tool 10. The power tool 12 is realized as a power angle grinder. The insert tool 10 is realized as a grinding disk. The insert tool 10 has a connection means 46 (see FIG. 4). The connection means 46 is realized as a through-recess 50.

The power tool 12 has a quick-change clamping device. The quick-change clamping device is designed for arranging at least one insert tool 10 on the power tool 12. The power tool 12 has an actuating means 52 for opening and closing the quick-change clamping device. The actuating means 52 is realized as a pull lever 54. The pull lever 54 has an eccentric 74. The actuating means 52 is designed, in particular by means of the eccentric 74, to move an unlocking pin 76 (see FIG. 2) of the quick-change clamping device in the axial direction. The unlocking pin 76 is designed to unlock the quick-change clamping device, upon movement of the unlocking pin 76 into the housing 78 of the power tool 12. In the case of locking of the quick-change clamping device, the unlocking pin 76 moves out of the housing 78 of the power tool 12. The actuating means 52 shown in FIG. 1 is in a closed state. The power tool 12 has a drive unit 56. The drive unit 56 is designed, at least, to provide a movement energy that is designed to move, in particular to rotate, an insert tool 10. The drive unit 56 is arranged in the housing 78.

Figure 2:
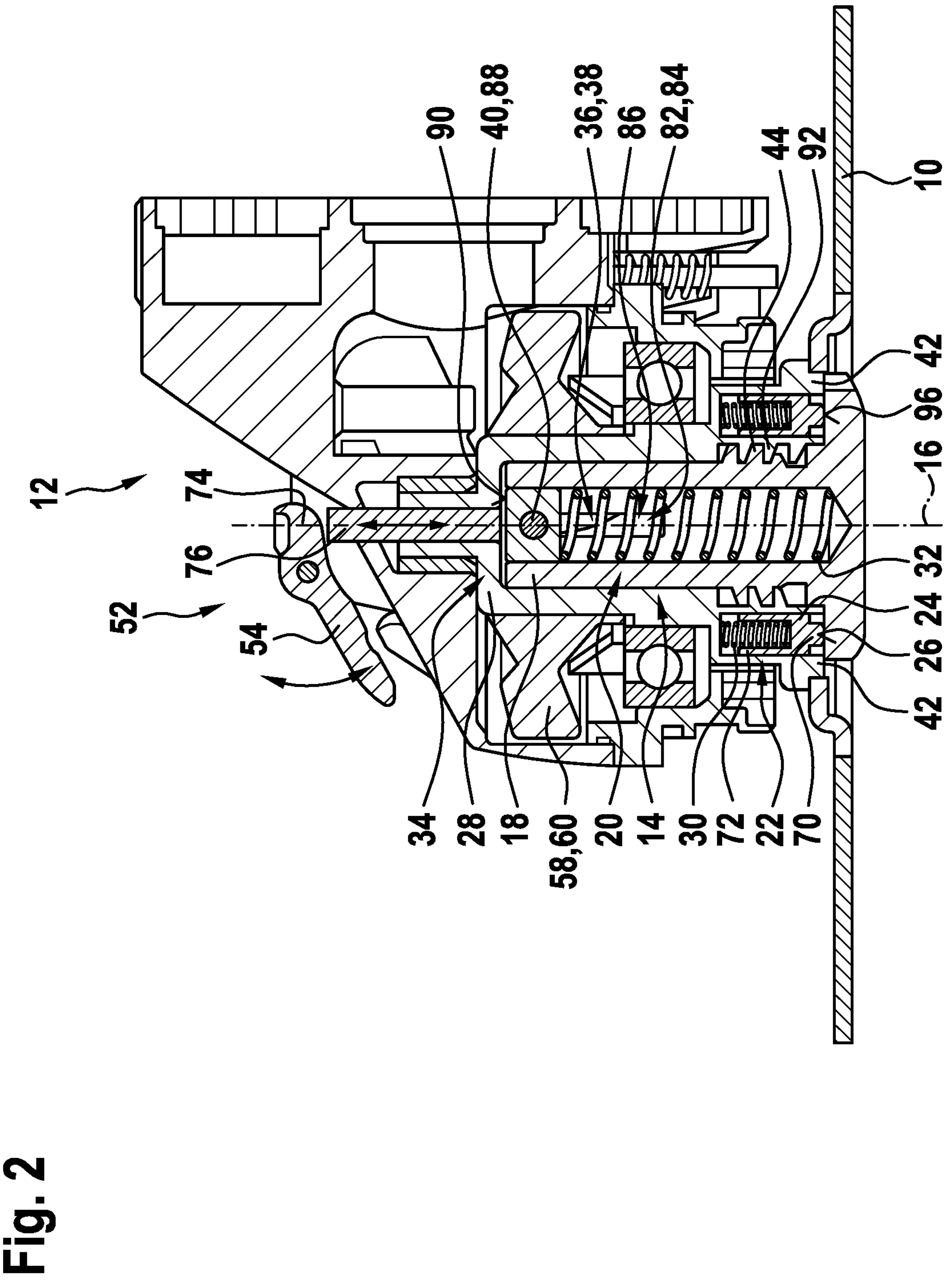

FIG. 2 shows a central section through the quick-change clamping device. The quick-change clamping device has an output unit 14. The output unit 14 is designed to move the insert tool 10 about an output axis 16 of the output unit 14. The output unit 14 has an output element 28. The output element 28 is realized as a cylindrical hollow shaft. The output element 28 is centered around the output axis 16.

The power tool 12 has a power transmission element 58 for transmitting, in particular taking up, power generated by the drive unit 56. The power transmission element 58 is realized as a bevel gear 60. The bevel gear 60 is connected by force closure to the output element 28. The bevel gear 60 is connected to the drive unit 56 by means of methods commonly used by persons skilled in the art, for example drive pinion and drive shaft (not shown). The bevel gear 60 can be driven in rotation by the drive unit 56.

The quick-change clamping device has a fixing unit 20. The fixing unit 20 is designed to axially fix the insert tool 10 on the output unit 14. The fixing unit 20 has a fixing element 18. The fixing element 18 is arranged in a captive manner on the output unit 14, in particular the output element 28, and/or is mounted in a non-removable manner on the output unit 14, in particular the output element 28. The fixing element 18 has a locking part 66. The locking part 66 is integral with the fixing element 18. The locking part 66, as viewed along the output axis 16, is arranged on a lower side that faces away from the output unit 14. The locking part 66 has a contour 48 in the shape of an angled cross. The locking part 66 is designed to produce a form closure for holding an insert tool 10 between the output element 28 and the locking part 66.

The fixing unit 20, in particular the fixing element 18, has a thread 44. The thread 44 of the fixing unit 20 is realized as a trapezoidal thread or as a buttress thread. The thread 44 of the fixing unit 20 is integral with the fixing element 18. The thread 44 of the fixing unit 20 is realized as an external thread. The output unit 14 has a further thread 92. The further thread 92 is integral with the output element 28. The further thread 92 is realized as an internal thread. The further thread 92 is realized as a trapezoidal thread or as a buttress thread. The thread 44 of the fixing unit 20 corresponds to the further thread 92.

The fixing element 18 is movably mounted. The fixing element 18 is mounted so as to be movable, relative to the output unit 14, about the output axis 16. The fixing element 18 is mounted so as to be movable, relative to the output unit 14, in the direction of the output axis 16. The quick-change clamping device has a securing unit 22. The securing unit 22 has two securing elements 24. A maximum possible axial displacement of the fixing element 18 from a position that can be fixed by the securing element 24 is at most 10 mm. The maximum possible axial displacement of the fixing element 18 is defined by a pitch of the thread 44 and/or a pitch of the further thread 92. The securing element 24 is movably mounted. The securing element 24 is designed to secure the fixing element 18 against movement of the fixing element 18 about the output axis 16. When the fixation element 18 is secured by the securing element 24, the securing element 24 prevents rotation of the fixing element 18 by means of a form closure.

The securing element 24 has a contact surface 26. The contact surface 26 is designed to bear against the fixing element 18. The securing element 24 has an axial extension 70. The contact surface 26 is arranged on the axial extension 70. The securing element 24 has a further contact surface 96. The further contact surface 96 is designed, in at least one operating state, to bear against an insert tool 10.

The securing element 24 is movably mounted on the output element 28 of the output unit 14. The securing element 24 is mounted in a sleeve 72 delimited by the output element 28. The securing element 24 is mounted such that it can be moved into the sleeve 72 and moved out of the sleeve 72. The sleeve 72 is integral with the output element 28. The securing unit 22 has at least one securing spring 30. Each securing element 24 of the securing unit 22 has a securing spring 30. The securing spring 30 biases the securing element 24 with a spring force in the direction of a securing position of the securing element 24. The securing spring 30 shown in FIG. 2 is in a loaded state. In the absence of blocking by the fixing element 18, the securing element 24 moves out of the sleeve 72 by means of the securing spring 30.

The fixing unit 20 has a clamping spring 32. The fixing unit 20, in particular the fixing element 18, encompasses the clamping spring 32. The clamping spring 32 is arranged within the fixing unit 20, in particular within the fixing element 18. The clamping spring 32 is realized as a compression spring. FIG. 2 shows the clamping spring 32 in a non-loaded state. The clamping spring 32, in at least one operating state (see FIG. 3), generates a clamping force that, by means of transmission via the fixing element 18, produces a pressing force upon the contact surface 26 of the securing element 24. The securing element 24, in at least one operating state, prevents unloading of the clamping spring 32, in that it prevents the fixing element 18 from rotating.

The quick-change clamping device has a cam mechanism 34. The cam mechanism 34 is designed to move the fixing element 18 back and forth at least between two end positions, one of the end positions being a position that can be fixed by the securing unit 22. The cam mechanism 34 has a plurality of cam mechanism elements 38, 40, 82.

The output unit 14 has a cam mechanism element 38. The cam mechanism element 38 of the output unit 14 is realized as a recess 36 in the output element 28. The cam mechanism element 38 of the output unit 14 realizes a path 80 having a course angled in relation to the output axis 16. The fixing unit 20 has a cam mechanism element 82. The cam mechanism element 82 of the fixing unit 20 is realized as a recess 84 in the fixing element 18. The cam mechanism element 82 of the fixing unit 20 realizes a path 86 having a course parallel to the output axis 16. The cam mechanism element 40 of the cam mechanism 34 that differs from the cam mechanism elements 38, 82 of the output unit 14 and of the fixing unit 20 is realized as a movable cam mechanism element 88. The cam mechanism element 40 of the cam mechanism 34, in particular the movable cam mechanism element 88, is arranged, at least partially, within the fixing element 18. The cam mechanism element 40 of the cam mechanism 34, in particular the movable cam mechanism element 88, is arranged in an axially movable manner. The cam mechanism element 40 of the cam mechanism 34, in particular the movable cam mechanism element 88, is arranged in a rotationally movable manner. The cam mechanism element 40 of the cam mechanism 34, in particular the movable cam mechanism element 88, engages, at least partially, in the cam mechanism element 38 of the output unit 14 and/or in the cam mechanism element 82 of the fixing unit 20. The cam mechanism element 40 of the cam mechanism 34, in particular the movable cam mechanism element 88, has a contact surface 90 that is designed to bear against the unlocking pin 76, in at least one operating state.

Pressing the unlocking pin 76 into the housing 78 of the power tool 12 causes an axial displacement of the cam mechanism element 40 of the cam mechanism 34, in particular of the movable cam mechanism element 88. As a result of the movable cam mechanism element 88 engaging with contact in the cam mechanism element 38 of the output unit 14, the movable cam mechanism element 88 follows the angled path 80 of the cam mechanism element 38 of the output unit 14, causing a rotational movement of the movable cam mechanism element 88. The rotational movement of the movable cam mechanism element 88 engaging in the cam mechanism element 82 of the fixing unit 20 forces the fixing element 18, arranged between the movable cam mechanism element 88 and the output unit 14, to rotate.

The output unit 14 has at least one torque transmission element 42. The torque transmission element 42 is designed to transmit a torque from the output unit 14 to an insert tool 10. The torque transmission element 42 is integral with the output element 28. The torque transmission element 42 has an outer contour 68 in the shape of an angled cross (see FIG. 3). The torque transmission element 42 is designed to form a form closure with an insert tool 10, in the mounted state, by means of the outer contour 68.

Figure 3:
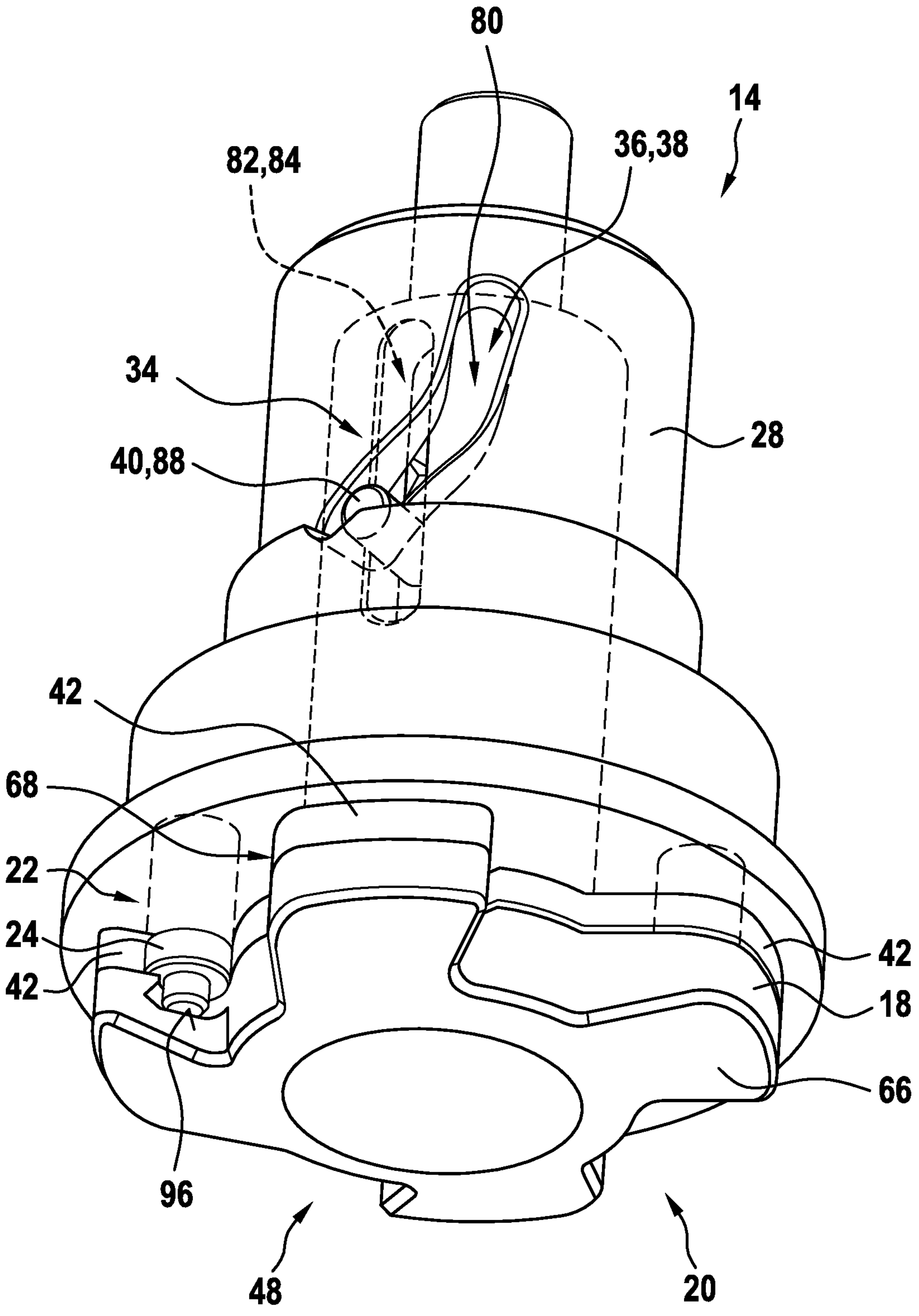

The outer contour 68 of the torque transmission element 42 is realized so as to be congruent with the fixing element 18, in particular the locking part 66 of the fixing element 18, in at least one position of the fixing element 18 (see FIG. 3). The outer contour 68 of the torque transmission element 42 is realized so as to be congruent with the connection means 46 of the insert tool 10, in at least one position of the insert tool 10.

The connection means 46, in particular an inner contour 94 of the connection means 46, is realized so as to correspond to a contour 48 of the fixing element, in particular of the locking part 18 of the quick-change clamping device.

A movement of the movable cam mechanism element 88, in particular in the case of clamping of the clamping spring 32, by a distance of X, results in a rotation of the fixing element 18 by an angle α. This rotation causes, in particular by means of the thread 44 and/or the further thread 92, an axial displacement that depends on a pitch S of the thread 44 and/or of the further thread 92. The axial displacement is thus a/360°*S. A transmission ratio of a clamping force of the clamping spring 32 to a clamping force of the fixing element 18 is U=X*360°*S/α. The clamping force of the fixing element 18 is consequently U times greater than the clamping force of the clamping spring 32.

In the exemplary embodiment shown, in the case of a maximum displacement of the movable cam mechanism element 88 of X=11 cm, α=36° and S=3 mm. In the exemplary embodiment shown, the transmission ratio assumes the value U=37.

The invention claimed is:

1. A quick-change clamping device for arranging at least one insert tool on a power tool, comprising:

an output unit having an output element configured as a cylindrical shaft configured to move the insert tool about an output axis of the output unit; and a fixing unit having a fixing element movably mounted on the output unit and configured to axially fix the insert tool on the output unit, wherein the output element is configured to transmit a rotational and/or oscillating movement around the output axis to the insert tool fixed to the output unit via the fixing unit, wherein the quick-change clamping device has an open state in which mounting and demounting of the insert tool is enabled, and a closed state in which the fixing element holds the insert tool on the quick-change clamping device, wherein the fixing element rotates about the output axis relative to the output element when the quick-change clamping device transitions between the open and closed states, and wherein the fixing element is captively connected to the output element in both the open and closed states.

2. The quick-change clamping device as claimed in claim 1, wherein the cylindrical shaft is configured as a hollow cylindrical shaft.

3. The quick-change clamping device as claimed in claim 1, wherein the fixing element is mounted in a non-removable manner on the output unit.

4. The quick-change clamping device as claimed in claim 1, wherein the fixing element is configured such that rotation of the fixing element about the output axis relative to the output element causes the fixing element to simultaneously move relative to the output element in an axial direction.

5. The quick-change clamping device as claimed in claim 1, further comprising:

at least one securing unit having at least one securing element configured to, in a first state, secure the fixing element against rotational movement relative to the output unit.

6. The quick-change clamping device as claimed in claim 5, wherein, in a second state, the securing element mounts the fixing element movably relative to the output unit at least about the output axis.

7. The quick-change clamping device as claimed in claim 6, wherein the securing unit has at least one securing spring, which biases the securing element with a spring force in a direction of a securing position of the securing element.

8. The quick-change clamping device as claimed in claim 6, wherein the fixing unit has at least one clamping spring configured, in at least one operating state, to generate a clamping force that, by transmission via the fixing element, produces a pressing force upon the securing element.

9. The quick-change clamping device as claimed in claim 6, further comprising:

a cam mechanism configured to move the fixing element back and forth at least between a first end position, in which the quick-change clamping device is in the open state, and a second end position, in which the quick-change clamping device is in the closed state, wherein one of the first and second end positions is a position at which the fixing element is fixed by the securing unit.

10. The quick-change clamping device as claimed in claim 6, wherein the at least one securing element is movably mounted.

11. The quick-change clamping device as claimed in claim 1, further comprising:

a cam mechanism configured to move the fixing element back and forth at least between a first end position, in which the quick-change clamping device is in the open state, and a second end position, in which the quick-change clamping device is in the closed state, the cam mechanism comprising a first recess defined in the output element and a second recess defined in the fixing element, the first and second recesses being arranged at least partially at an angle relative to one another.

12. The quick-change clamping device as claimed in claim 11, wherein the cam mechanism further comprises at least one cam mechanism element arranged at least partially in a movable manner within the first and second recesses.

13. The quick-change clamping device as claimed in claim 1, wherein the output unit has at least one torque transmission element arranged at least substantially congruent with the fixing element in at least one position of the fixing element.

14. The quick-change clamping device as claimed in claim 1, wherein the fixing unit has at least one thread configured as one of a trapezoidal thread and a buttress thread.

15. The quick-change clamping device as claimed in claim 1, wherein the power tool is a power angle grinder.

16. A power tool, comprising:

at least one quick-change clamping device configured to arrange at least one insert tool on the power tool, the at least one quick-change clamping device comprising:

an output unit having an output element configured as a cylindrical shaft configured to move the insert tool about an output axis of the output unit; and a fixing unit having a fixing element movably mounted on the output unit and configured to axially fix the insert tool on the output unit, wherein the output element is configured to transmit a rotational and/or oscillating movement around the output axis to the insert tool fixed to the output unit via the fixing unit, wherein the quick-change clamping device has an open state in which mounting and demounting of the insert tool is enabled, and a closed state in which the fixing element holds the insert tool on the quick-change clamping device, wherein the fixing element rotates about the output axis relative to the output element when the quick-change clamping device transitions between the open and closed states, and wherein the fixing element is captively connected to the output element in both the open and closed states.

17. The power tool as claimed in claim 16, wherein the power tool is a power angle grinder.

18. A power tool system comprising:

at least one power tool comprising the quick-change clamping device as claimed in claim 1; and the at least one insert tool, which has at least one connection mechanism that corresponds, at least substantially, to a contour of the fixing element of the quick-change clamping device.

19. The power tool system as claimed in claim 18, wherein the at least one power tool is a power angle grinder.

* * * * *